United States Patent
Wang

(10) Patent No.: US 11,764,820 B2
(45) Date of Patent: Sep. 19, 2023

(54) FULL-AUTOMATIC GEAR DRIVEN CLAMPING TYPE SELF-LOCKING MOBILE PHONE HOLDER

(71) Applicant: Shenzhen Xinruida Electronic Hardware Plastic Co. Ltd., Shenzhen (CN)

(72) Inventor: Quanwei Wang, Henan (CN)

(73) Assignee: SHENZHEN XINRUIDA ELECTRONIC HARDWARE PLASTIC CO., Shenzhen (CN)

( * ) Notice: Subject to any disclaimer, the term of this patent is extended or adjusted under 35 U.S.C. 154(b) by 433 days.

(21) Appl. No.: 17/277,145

(22) PCT Filed: Jan. 14, 2019

(86) PCT No.: PCT/CN2019/071526
§ 371 (c)(1),
(2) Date: Mar. 17, 2021

(87) PCT Pub. No.: WO2020/062714
PCT Pub. Date: Apr. 2, 2020

(65) Prior Publication Data
US 2022/0060208 A1    Feb. 24, 2022

(30) Foreign Application Priority Data
Sep. 27, 2018  (CN) .......................... 201821586175.5

(51) Int. Cl.
*H04B 1/00*         (2006.01)
*H04B 1/3877*    (2015.01)
(Continued)

(52) U.S. Cl.
CPC ........... *H04B 1/3877* (2013.01); *F16M 11/04* (2013.01); *H04M 1/04* (2013.01)

(58) Field of Classification Search
CPC .... H04B 1/3877; F16M 11/04; F16M 11/041; H04M 1/04; H04M 1/06
See application file for complete search history.

(56) References Cited

U.S. PATENT DOCUMENTS

| 2010/0264182 A1* | 10/2010 | Perlman ................. H04M 1/04 224/409 |
| 2014/0339278 A1* | 11/2014 | Ditore .................. H04B 1/3877 224/411 |
| 2016/0241289 A1* | 8/2016 | Wieth .................. H04B 1/3877 |

* cited by examiner

*Primary Examiner* — Moustapha Diaby
(74) *Attorney, Agent, or Firm* — Chun-Ming Shih; LANWAY IPR SERVICES

(57) ABSTRACT

The present invention relates to the field of car holders for mobile phones. The car holders in existing technologies have problems such as cumbersome operations and a requirement of auxiliary buttons. In order to solve the problems in existing technologies, the present invention provides a full-automatic gear driven clamping type self-locking mobile phone holder, including a base, wherein the base is provided with a rack column, two sides of which are provided with a first rack; a shell is sleeved on the rack column in a sliding manner, a gear is provided on two sides inside the shell, and the gear is meshed with the first rack on the same side; a clamp arm is provided on the shell on the two sides of the rack column respectively, a guide slide arm is provided with a second rack extending along the guide direction, and the second rack is meshed with the gear on the same side; the shell is internally connected to a reset spring, and the reset spring has a free end connected to the rack column; when the shell is stressed to move downwards, the reset spring is continuously compressed, and the downward force drives the first rack to rotate the gear, and the gear drives the two second racks away from each other. Compared with the existing technologies, the present invention has advantages of convenient usage and compact structure.

10 Claims, 14 Drawing Sheets

(51) Int. Cl.
*F16M 11/04* (2006.01)
*H04M 1/04* (2006.01)

FULL-AUTOMATIC GEAR DRIVEN CLAMPING TYPE SELF-LOCKING MOBILE PHONE HOLDER

TECHNICAL FIELD

The present invention relates to the field of car holders for mobile phones, and in particular to a full-automatic gear driven clamping type self-locking mobile phone holder.

BACKGROUND

There are many kinds of car holders available on the market, including magnetic type car holders, clamping type car holders, rotating type car holders, gravity type car holders and electric car holders. Different car holders have their own shortcomings.

For magnetic type car holders, it is needed to attach a magnetic guide sheet onto the backside of a mobile phone, which seriously impacts the appearance of the mobile phone. Moreover, magnet has different degrees of influences to the performances of the mobile phone.

For clamping type car holders, generally the elastic force needs to be made large enough to clamp a mobile phone; under the action of the elastic force, clamp arms will generate a great clamping force at the instant time of clamping, which might damage the mobile phone. Moreover, it is also needed to manually operate one or more auxiliary buttons arranged on the clamping type car holders to open the clamp arms to remove the mobile phone. It is very inconvenient in usage.

For rotating type car holders, they utilize the rotation of internal components to change the distance between two clamp arms to clamp or loosen a mobile phone. The shortcoming is that the shape is relatively big due to the working principle.

Gravity type car holders are loose in whole structures and will generate noises during the driving process if not clamping a mobile phone, thus impacting usage experience. Gravity type car holders cannot adjust angle and are inconvenient in usage.

For clamping type car holders, since mobile phones get bigger and bigger now, it is difficult to reach the buttons at two ends with one single hand, thus potential safety hazards exist during the driving process; therefore, it is urgent to improve the car holders for mobile phones based on the change tendency of mobile phones and the shortcomings of existing technologies.

SUMMARY

The present invention aims to design a full-automatic gear driven clamping type self-locking mobile phone holder, so as to solve the defects in existing clamping type car holders for mobile phones that the operation is cumbersome and auxiliary buttons are needed to remove the mobile phone and that the elastic force is too strong and is easy to cause damage to the mobile phone. The present invention has advantages of convenient usage and compact structure.

The present invention is realized through the following technical scheme.

A full-automatic gear driven clamping type self-locking mobile phone holder is provided, including: a base, wherein the base is provided with a rack column, and two sides of the rack column are vertically provided with a first rack; a shell is sleeved on the rack column in a sliding manner, the shell is in guide fit the rack column, the shell and the rack column can slide relative to each other in vertical direction, a gear is provided inside the shell on the two sides of the rack column respectively, and the gear is meshed with the first rack on the same side; a clamp arm is provided on the shell on the two sides of the rack column respectively, a guide slide arm of the clamp arm is inserted into the shell in a sliding manner, the guide slide arm is provided with a second rack extending along the guide direction, and the second rack is meshed with the gear on the same side; the shell is internally connected to a reset spring, and the reset spring has a free end connected to the rack column; when the shell is stressed to move downwards, the reset spring is continuously compressed, the gear is rotated under the action of the first rack, and the rotated gear drives the two second racks away from each other.

With the above structure, corresponding first rack, gear and second rack are meshed successively to form a plane gear drive mechanism, such that the structure of the car holder for mobile phone can be designed to be more flat and compact, thereby solving the defects in existing clamping type car holders for mobile phones that additional buttons are needed to remove the mobile phone.

When the shell is pressed down, since the gear is installed in the shell through a rotating shaft, the gear moves downwards along with the shell; moreover, as the gear is meshed with the first rack, then the gear is rotated, and the rotated gear drives the meshed second rack to move towards the outside of the shell, thereby driving the two second racks away from each other; the reset spring is continuously compressed during the downward movement of the shell, after the shell is stopped being pressed down, the reset spring pushes the shell to move upwards, thereby driving the two second racks close to each other; in this way, the clamp arm can automatically clamp and loosen the mobile phone, single-hand operation can be realized, and the usage is very convenient.

Different from the existing clamp arm return design in which a spring is directly connected to two clamp arms, when the clamp arm of the present invention is reset, the restoring force provided by the reset spring passes through the first rack, the gear and the second rack in turn, thus the clamp arms on the two sides can slowly clamp the mobile phone, thereby solving the problem that the elastic force is too strong and causes damage to the mobile phone.

Further, to better implement the present invention, the following structure is employed particularly. The shell includes a surface cover, a spacer and a lower cover that are overlapped successively; the spacer defines a slide arm guide groove, the guide slide arm is in guide fit with the slide arm guide groove, the gear is connected to the lower cover, the rack column is located inside the lower cover, and the rack column is in guide fit with the lower cover.

Further, to better implement the present invention, the following structure is employed particularly. The holder further includes a spring self-locking mechanism arranged inside the shell, wherein the spring self-locking mechanism includes a catapult installed on the rack column and a self-locking guide groove connected to the spacer, and when the shell is pressed down, a locking head of the catapult is capable of moving inside the self-locking guide groove to achieve self-locking and self-unlocking.

With the above structure, when placing and removing a mobile phone, it is only needed to press down the shell in place to lock the shell with the rack column, then the clamp arms are ready in the opening position and the locking position. One time of pressing achieves clamping, one time of pressing again achieves loosening, and it is more convenient to achieve single-hand operation.

Further, to better implement the present invention, the following structure is employed particularly. The self-locking guide groove includes a vertically arranged face plate and a side baffle connected to two sides of the face plate, a middle position on the face plate is provided with a roundabout, the roundabout has a bottom part provided with a left guide surface that is used for guiding the locking head of the catapult to the left, the locking head points to the left guide surface when the catapult and the self-locking guide groove are in an unlocking state, the roundabout has a top part defining a locking groove that is used for locking the locking head, a left top position on the face plate is provided with a first right guide surface that is used for guiding the locking head to the right, a right top position on the face plate is provided with a second right guide surface that is used for guiding the locking head to the right, a left end of the second right guide surface is protruded downwards to form a locking head limit groove having a downward opening with the first right guide surface, the locking head limit groove is located on the left side of the locking groove, and the locking groove has an opening facing the second right guide surface Further, to better implement the present invention, the following structure is employed particularly. A left projecting tongue and a right projecting tongue are provided on the face plate below the roundabout, an entrance is formed between the left projecting tongue and the right projecting tongue, and the left guide surface has a right end beyond the right side of the entrance.

Further, to better implement the present invention, the following structure is employed particularly. A universal ball with an upward ball joint is arranged on the base, the ball joint of the universal ball is moveably sleeved with a bogie, and the bogie is in fixed connection with the rack column.

With the above structure, the shell can be rotated to many angles, thereby adjusting the deflection angle of the mobile phone to achieve horizontal and vertical placements of the mobile phone.

Further, to better implement the present invention, the following structure is employed particularly. A top part of the bogie is in fixed connection with a fixed sleeve, the fixed sleeve has a top inner ring provided with a plurality of convex teeth, the fixed sleeve has a middle part defining a concave center hole, the rack column has a bottom part provided with a gear ring and a center column located inside the gear ring and extending downwards, the center column is inserted into the center hole, the center column is provided with a bolt axially, the bolt passes through the center hole and the center column in turn to make the center hole and the center column axially fixed connected, the gear ring is located inside the inner ring of the fixed sleeve, and the convex teeth are meshed with the gear ring to achieve a fixed circumferential connection between the center hole and the center column;

the fixed sleeve has a bottom part defining a spring groove, in which a big spring is arranged; a ball joint top cover is arranged in the bogie, the ball joint top cover has a bottom surface fitting the ball joint of the universal ball, and the big spring has a free end pressing against a top surface of the ball joint top cover;

or, the fixed sleeve has a bottom part provided with a convex ring, a silicone sleeve is arranged inside the bogie, the fixed sleeve presses the silicone sleeve onto an inner wall of the bogie, the convex ring presses against a top part of the ball joint of the universal ball, and the silicone sleeve is wrapped on the ball joint of the universal ball.

Further, to better implement the present invention, the following structure is employed particularly. The bogie has a bottom end defining a notch through which a connection rod of the universal ball can pass through.

With the above structure, the connecting rod of the universal ball can enter the notch, and when the connecting rod of the universal ball is pulled towards the notch, the elevation angle of the shell can be adjusted to the maximum extent.

Further, to better implement the present invention, the following structure is employed particularly. The gear is an incomplete gear.

Further, to better implement the present invention, the following structure is employed particularly. A silicone mat is arranged on the clamp jaw of the clamp arm.

The present invention has the following advantages and beneficial effects.

In the present invention, corresponding first rack, gear and second rack are meshed successively to form a plane gear drive mechanism, such that the structure of the car holder for mobile phone can be designed to be more flat and compact, thereby solving the defects in existing clamping type car holders for mobile phones that additional buttons are needed to remove the mobile phone. When the shell is pressed down, since the gear is installed in the shell through a rotating shaft, the gear moves downwards along with the shell; moreover, as the gear is meshed with the first rack, then the gear is rotated, and the rotated gear drives the meshed second rack to move towards the outside of the shell, thereby driving the two second racks away from each other; the reset spring is continuously compressed during the downward movement of the shell, after the shell is stopped being pressed down, the reset spring pushes the shell to move upwards, thereby driving the two second racks close to each other; in this way, the clamp arm can automatically clamp and loosen the mobile phone, single-hand operation can be realized, and the usage is very convenient. Different from the existing clamp arm return design in which a spring is directly connected to two clamp arms, when the clamp arm of the present invention is reset, the restoring force provided by the reset spring passes through the first rack, the gear and the second rack in turn, thus the clamp arms on the two sides can slowly clamp the mobile phone, thereby solving the problem that the elastic force is too strong and causes damage to the mobile phone.

BRIEF DESCRIPTION OF THE DRAWINGS

For a better understanding of the embodiments of the present invention or the technical scheme of the existing technology, a brief introduction is given below to the drawings needed in the description of the embodiments or existing technology. Obviously, the following drawings are some embodiments of the present invention merely; for those skilled in the art, other drawings can be obtained according to these drawings without creative work.

DESCRIPTIONS OF DESIGNATORS IN DRAWINGS

1—a base, 1a—a base spacer, 1b—a base cover, 1c—a base orientator, 1d—a clamping spacer, 1e—a nut;
2—a rack column, 2a—a first rack, 2b—a shell guide groove, 2c presents a gear ring, 2d—a center column;
3—a shell, 3a—a surface cover, 3b—a spacer, 3c—a lower cover, 3d—a slide arm guide groove, 3e—a guide bar;
4—a gear;
5—a clamp arm, 5a—a guide slide arm, 5b—a second rack;
6—a reset spring;
7—a catapult;
8—a self-locking guide groove, 8a—a roundabout, 8b—a left guide surface, 8c—a locking groove, 8d—a first right guide surface, 8e—a second right guide surface, 8f—a locking head limit groove, 8g—a left projecting tongue, 8h—a right projecting tongue;
9—a universal ball;
10—a bogie, 10a—a notch;
11—a fixed sleeve, 11a—a convex tooth, 11b—a center hole, 11c—a convex ring;
12—a big spring;
13—a ball joint top cover;
14—a silicone mat;
15—a silicone sleeve.

DESCRIPTION OF THE EMBODIMENTS

To make the purpose, the technical scheme and the advantages of the present invention more apparent, a detailed description is provided to the technical scheme in the present invention. Obviously, the embodiments described hereinafter are simply part embodiments of the present invention, rather than all the embodiments. All other embodiments obtained by those skilled in the art based on the embodiments in the present invention without creative work are intended to be included in the scope of protection of the present invention.

Embodiment 1

Figure 1:
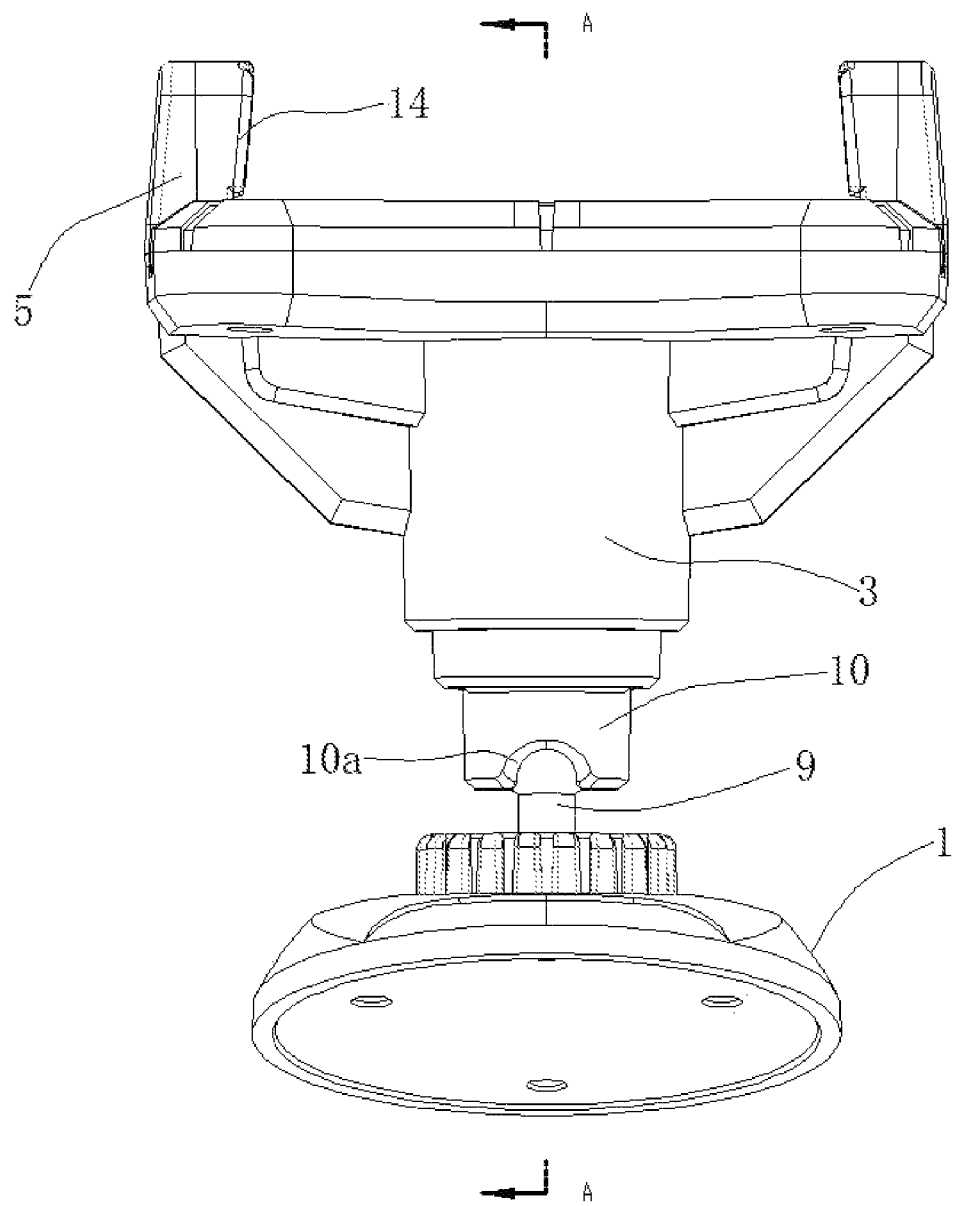
FIG. 1 is a front view of a full-automatic gear driven clamping type self-locking mobile phone holder.
Figure 2:
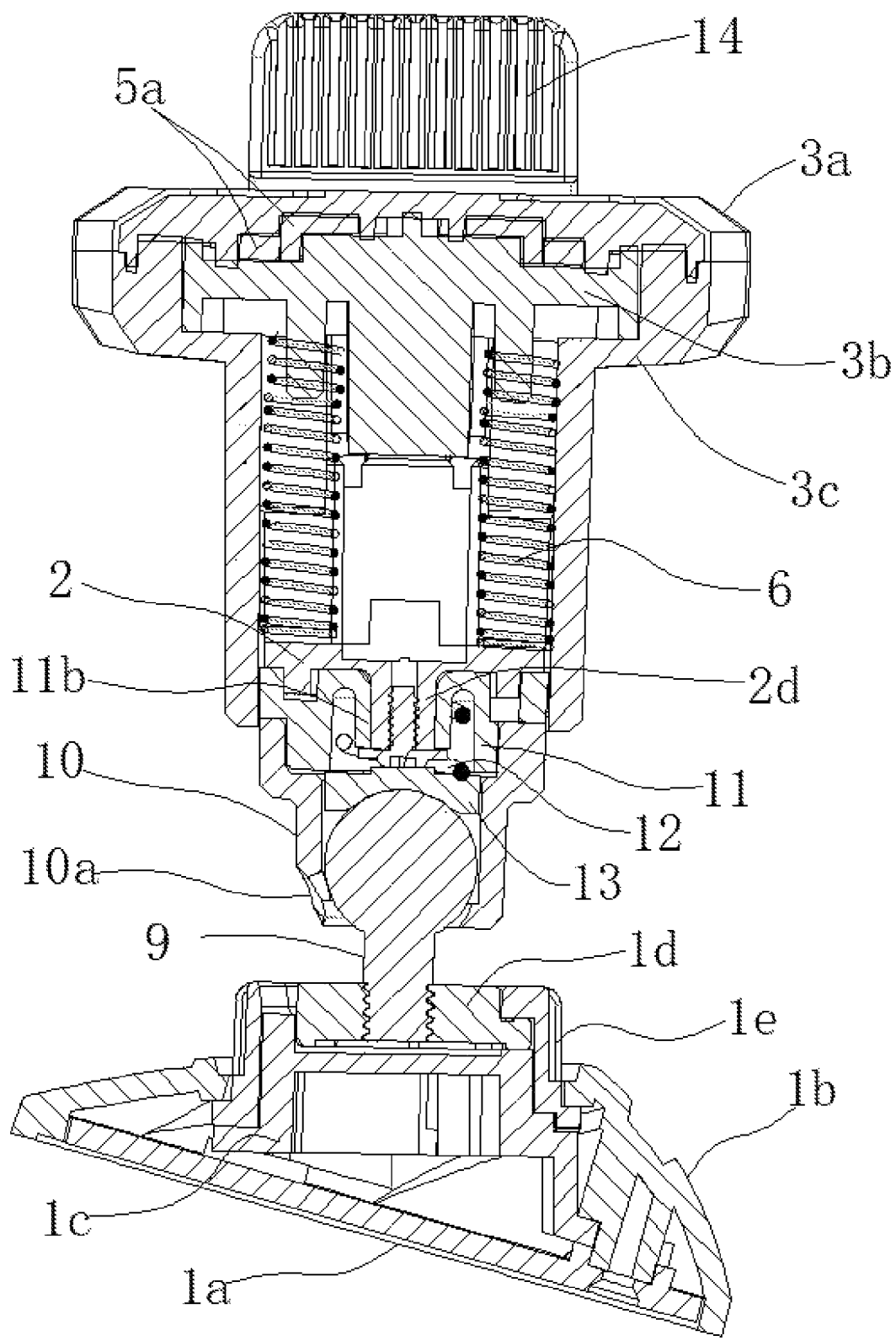
FIG. 2 is a sectional view of FIG. 1 along A direction.
Figure 3:
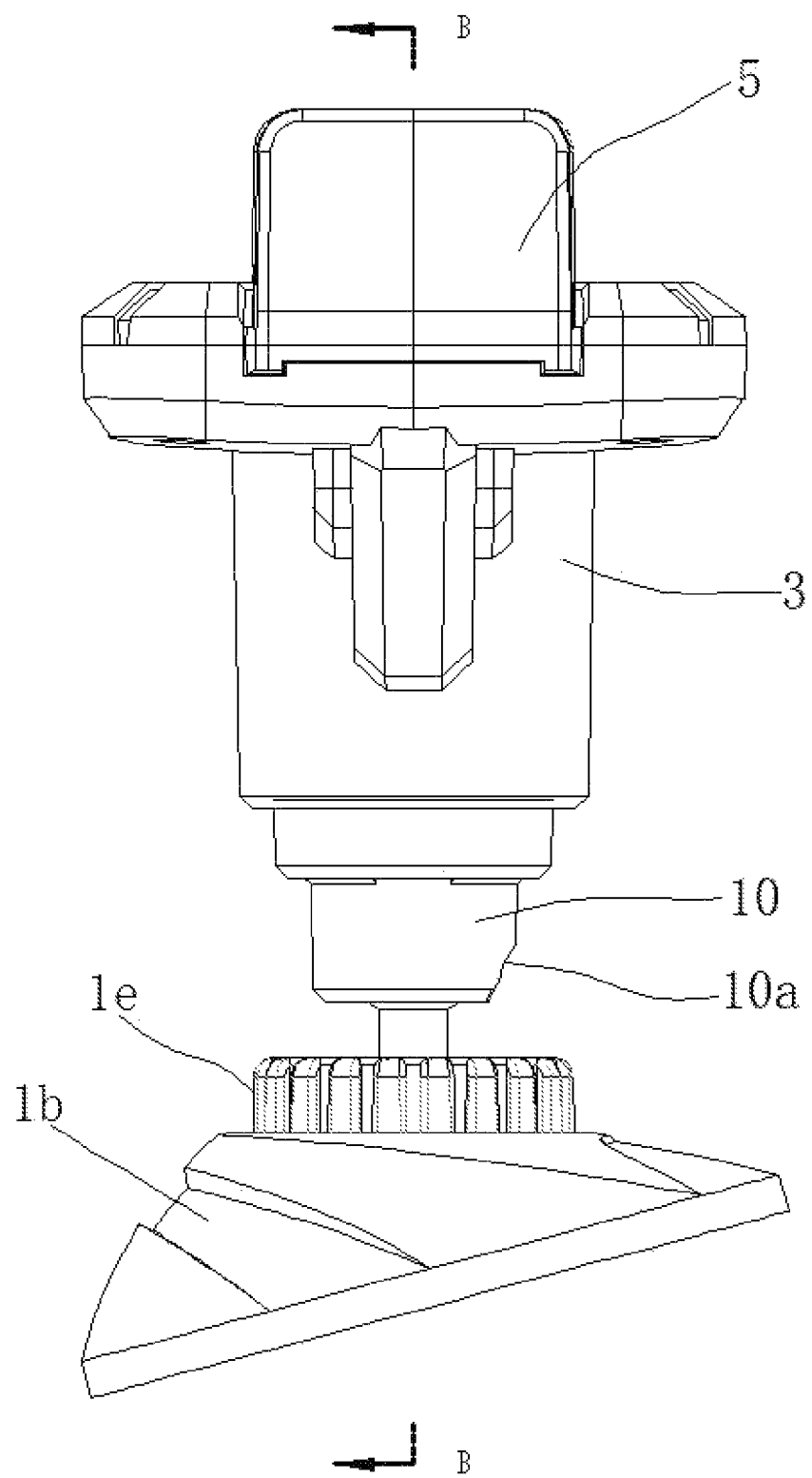
FIG. 3 is a side view of a full-automatic gear driven clamping type self-locking mobile phone holder.
Figure 4:
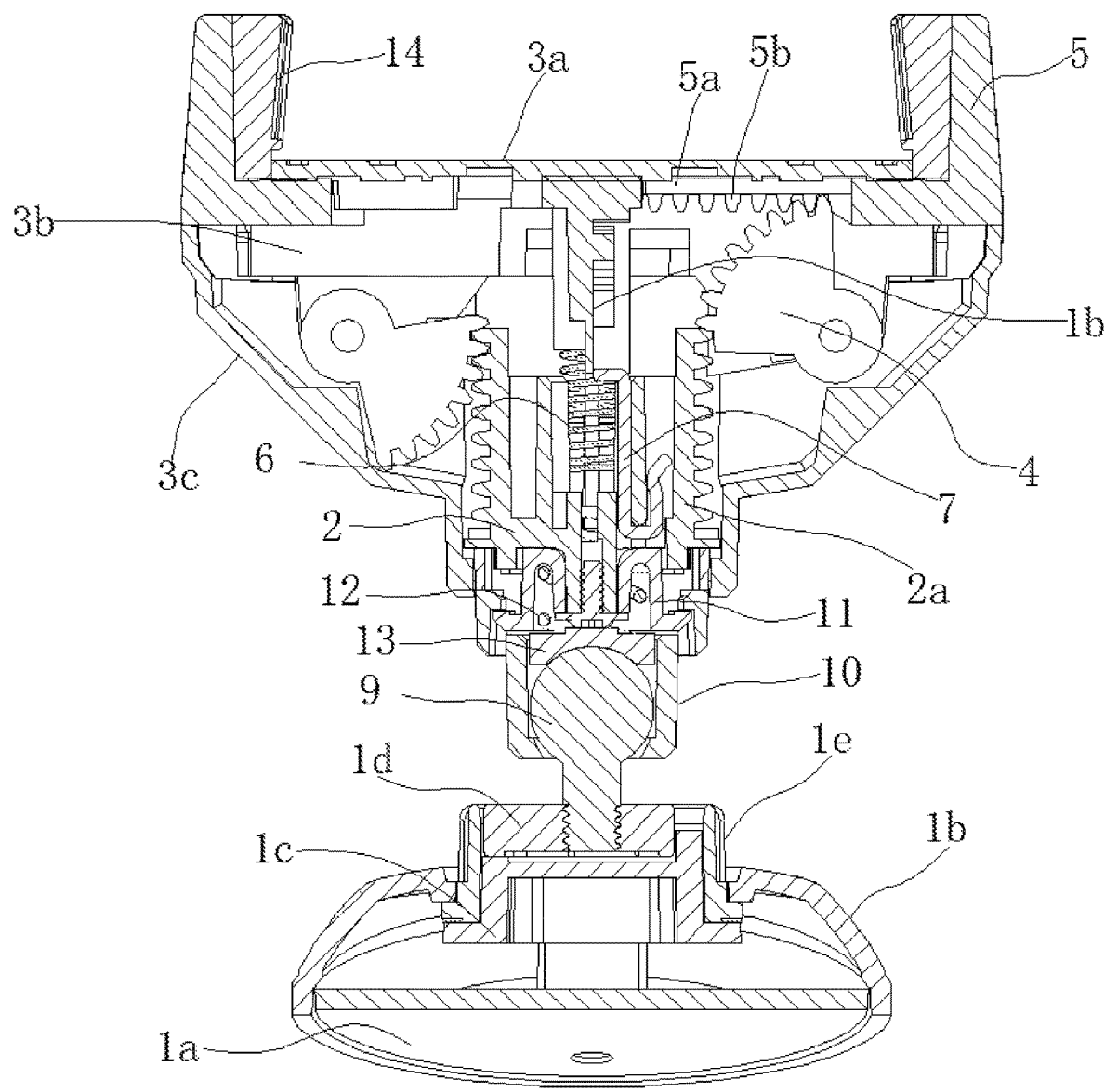
FIG. 4 is a sectional view of FIG. 2 along B direction when a big spring is employed.
Figure 5:
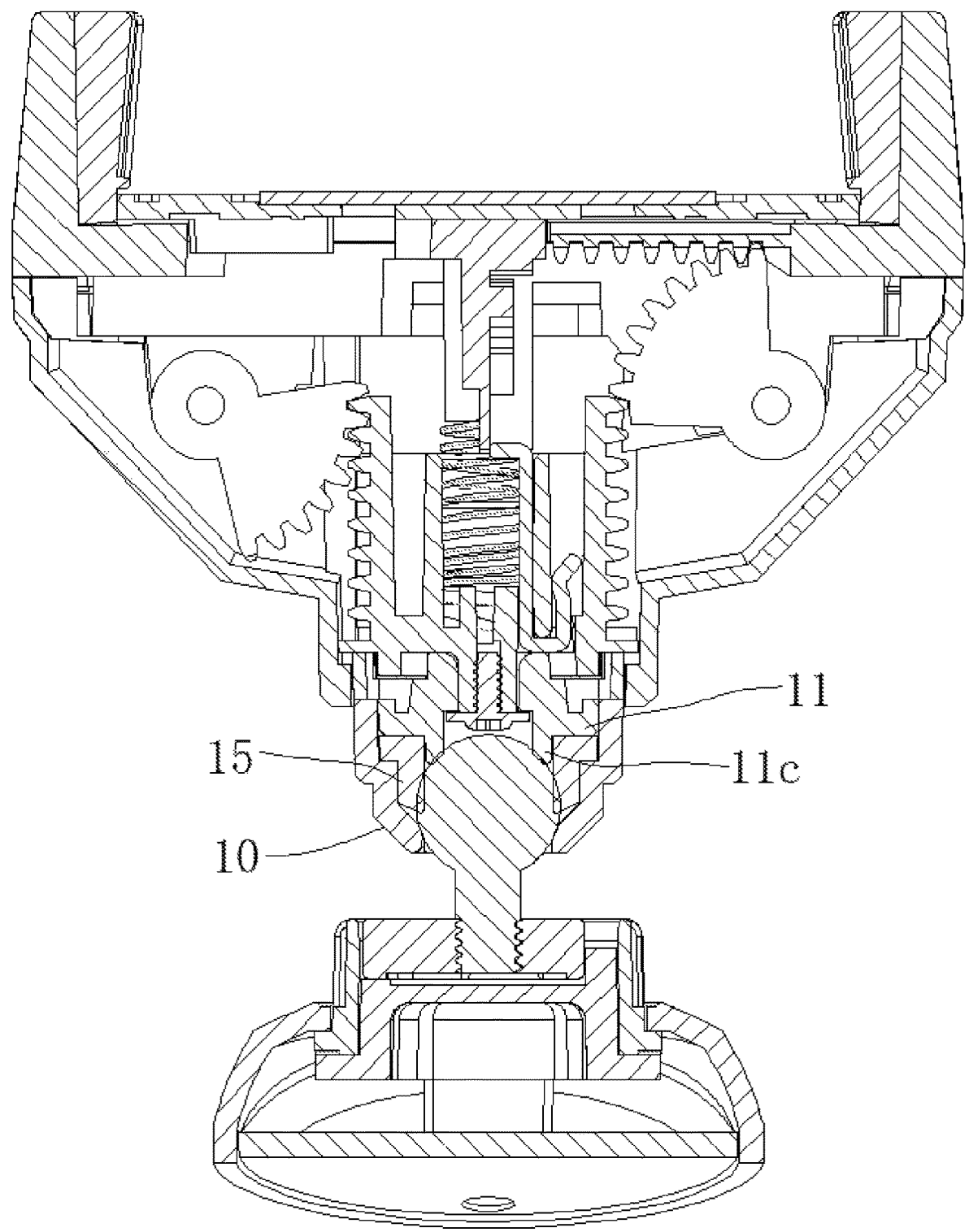
FIG. 5 is a sectional view of FIG. 2 along B direction when a silicone sleeve is employed.
Figure 6:
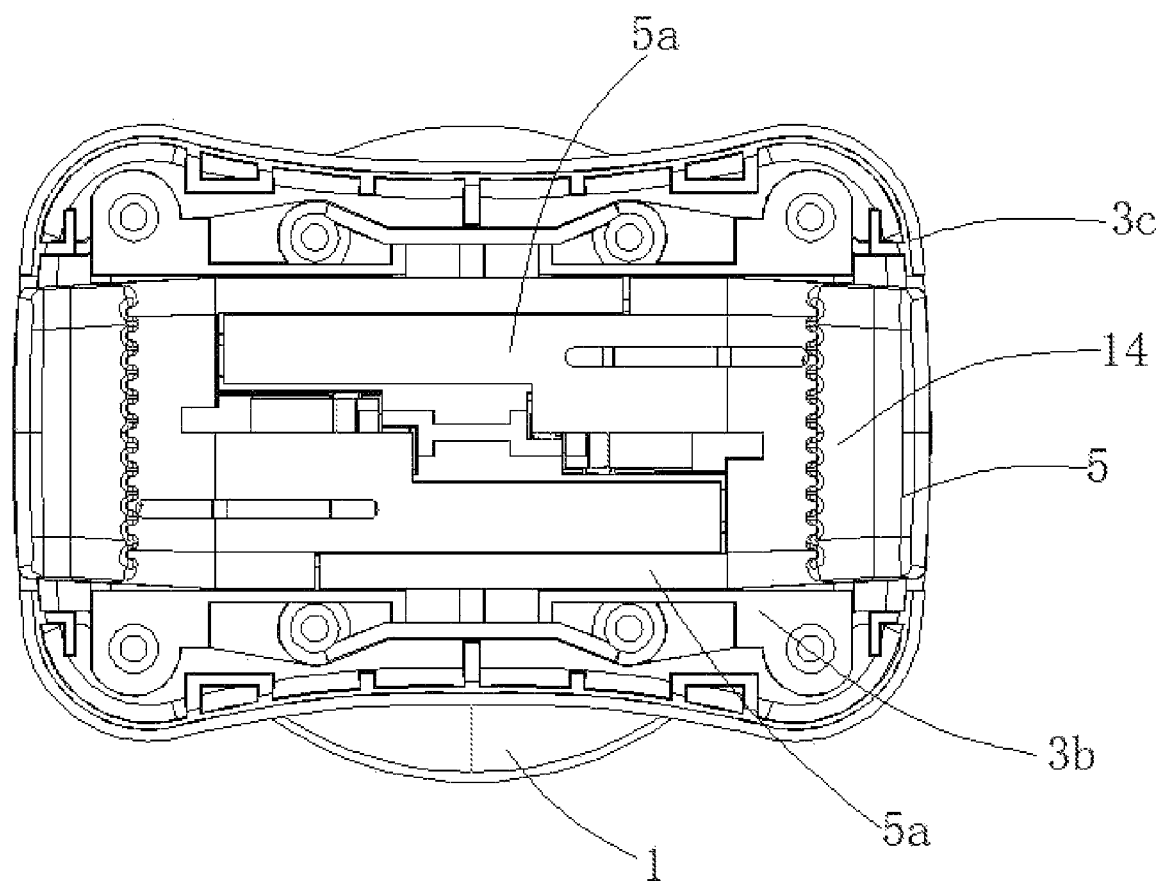
FIG. 6 is a top view of an internal structure of a shell.
Figure 7:
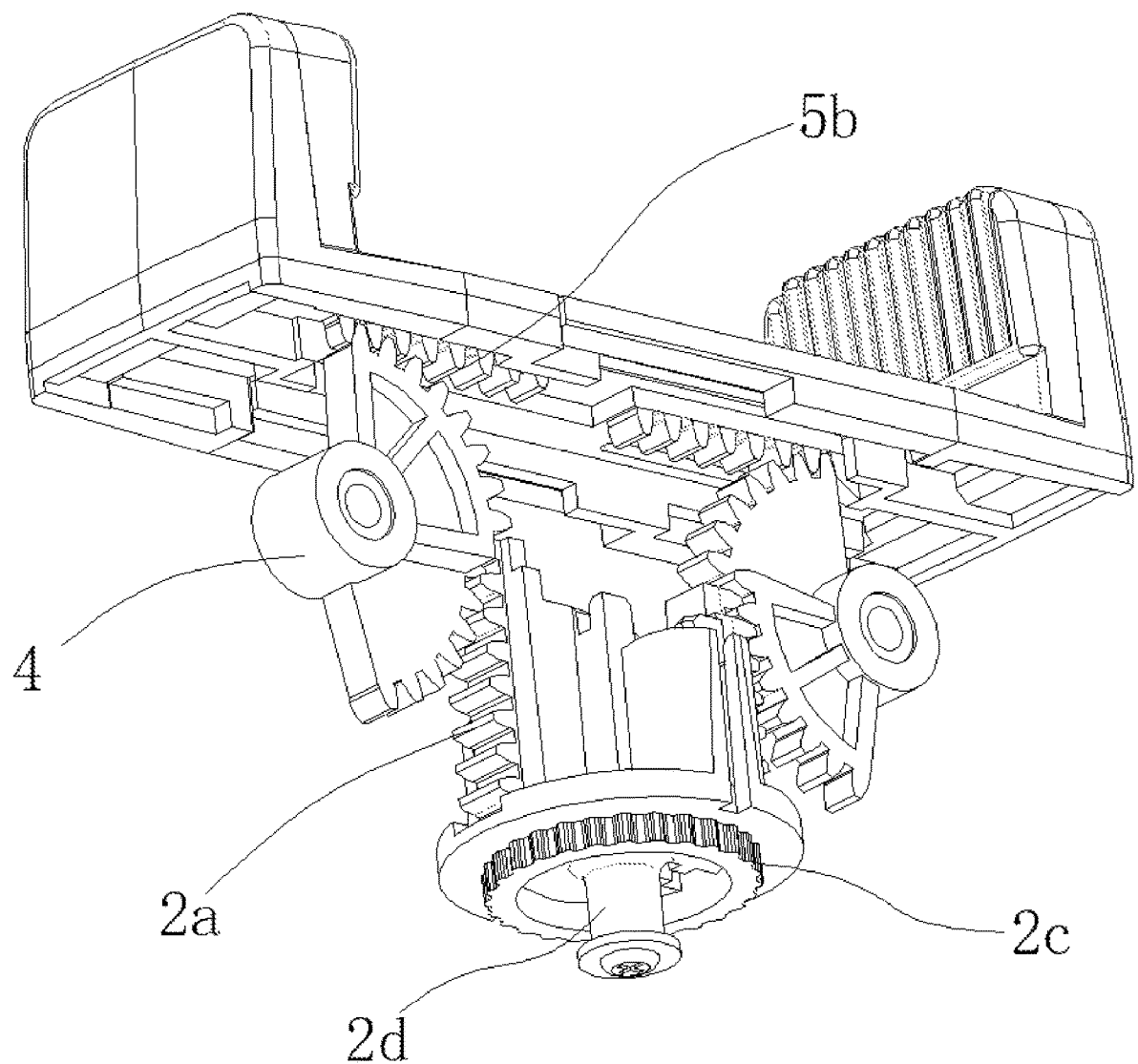
FIG. 7 is a structure diagram of a plane gear mechanism.
Figure 8:
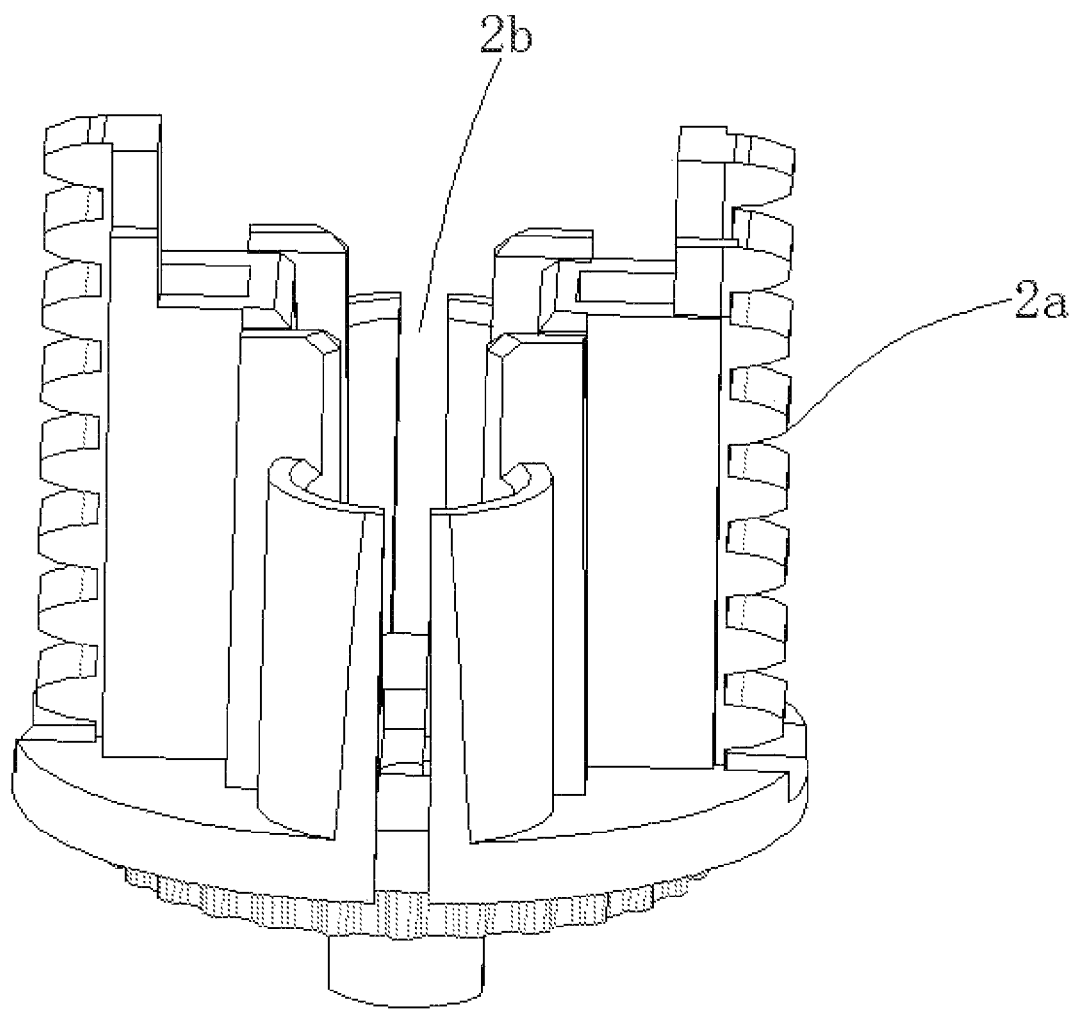
FIG. 8 is a structure diagram of a rack column.
Figure 9:
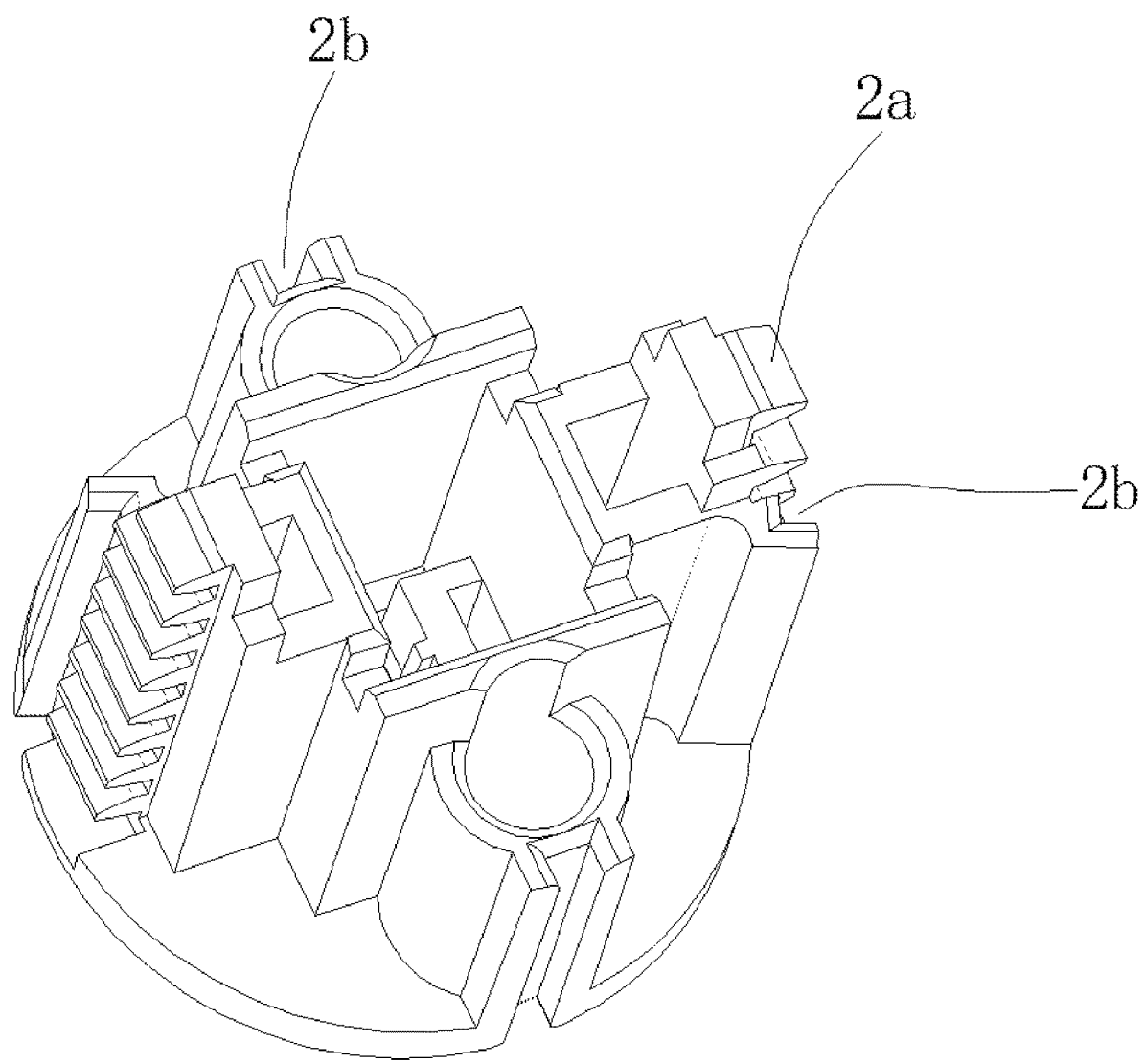
FIG. 9 is a preferred structure diagram of a rack column.
Figure 10:
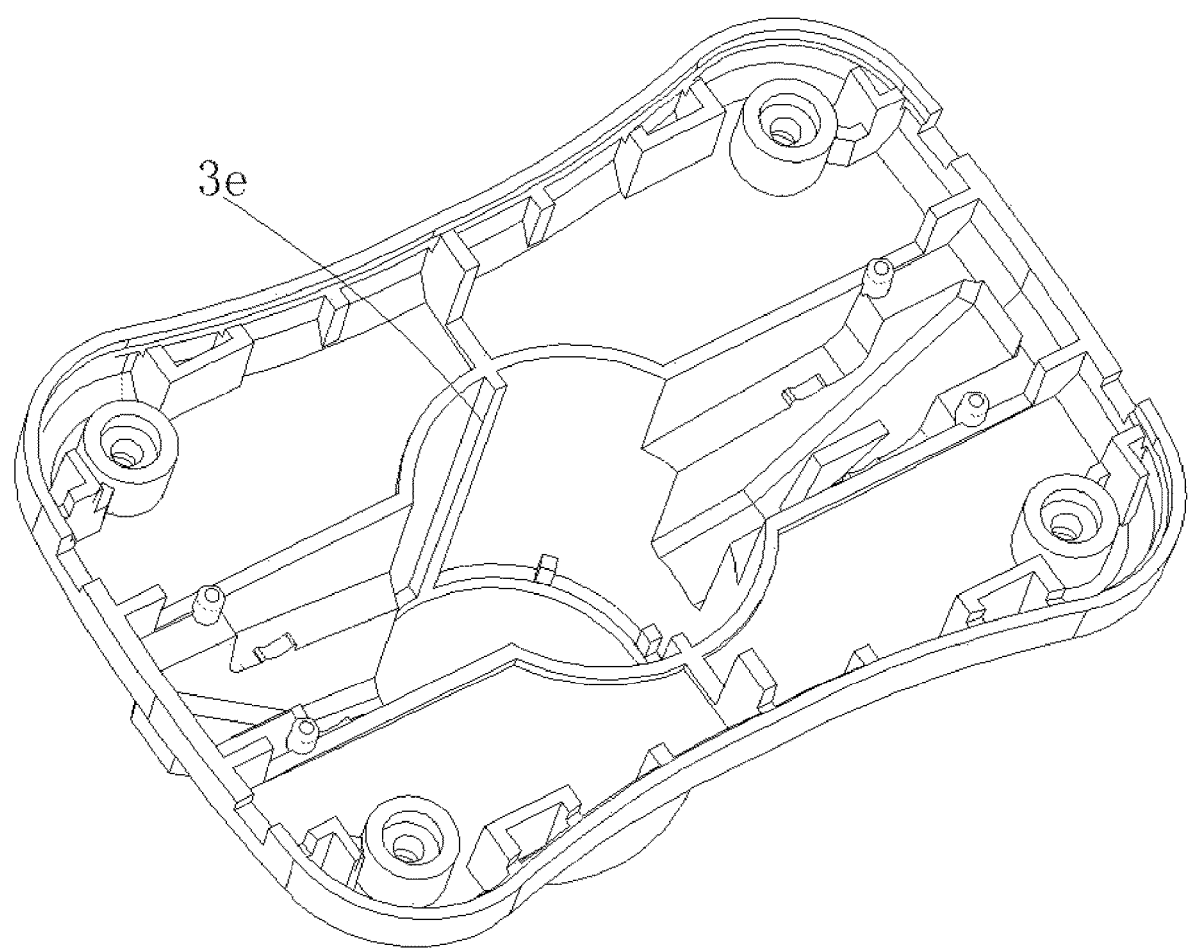
FIG. 10 is a structure diagram of a lower cover.
Figure 11:
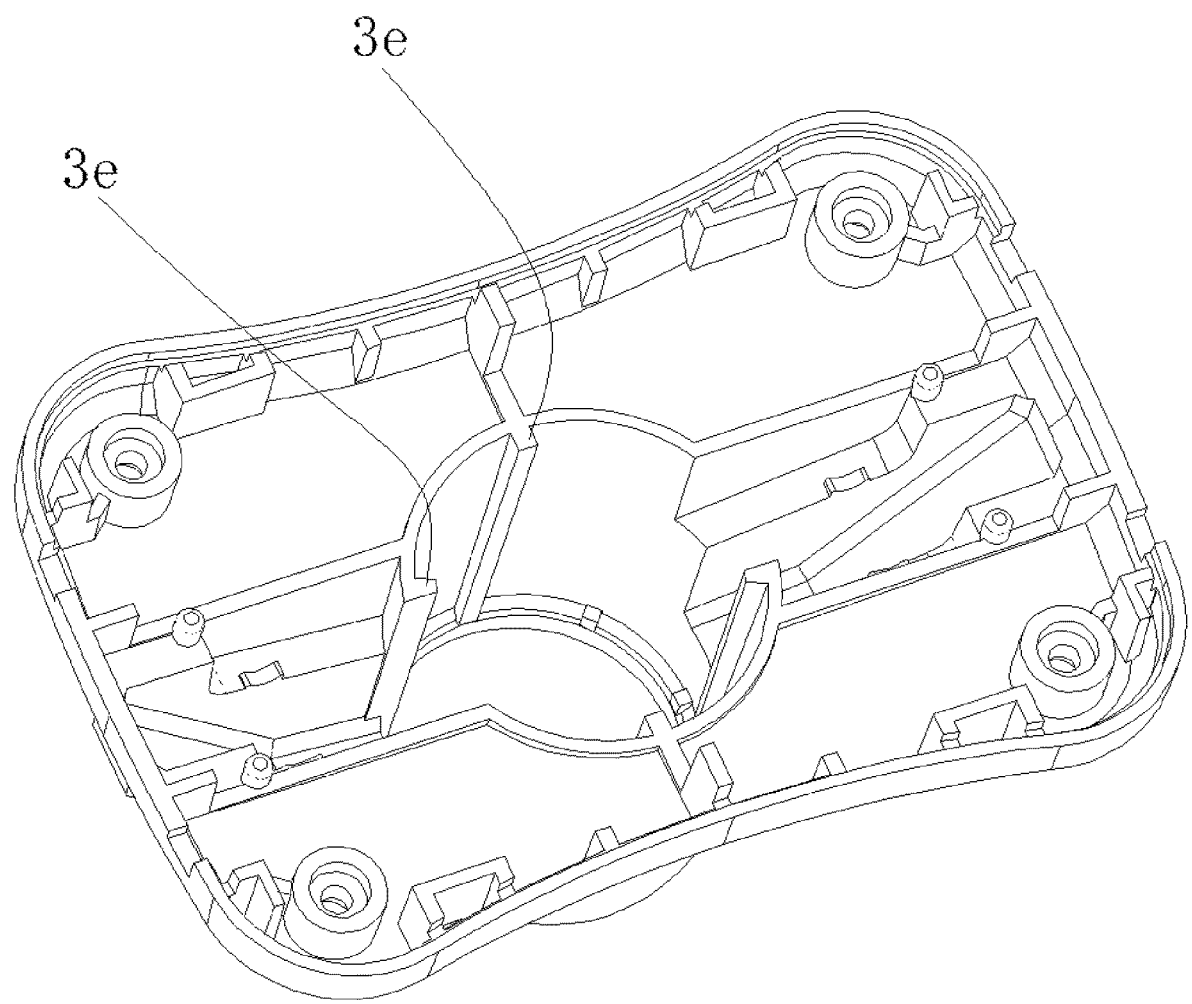
FIG. 11 is a structure diagram of a lower cover matched with FIG. 9.
Figure 12:
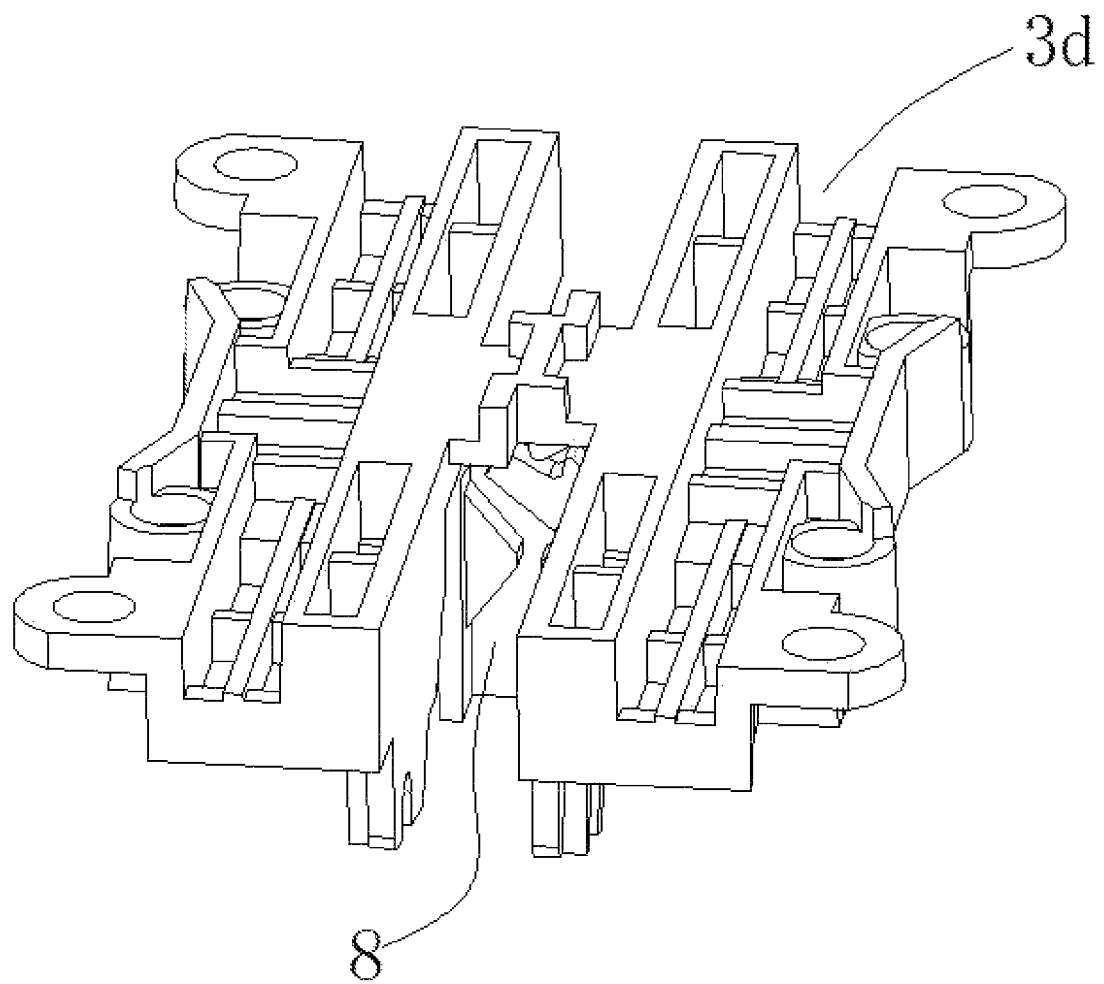
FIG. 12 is a structure diagram of a spacer.
Figure 13:
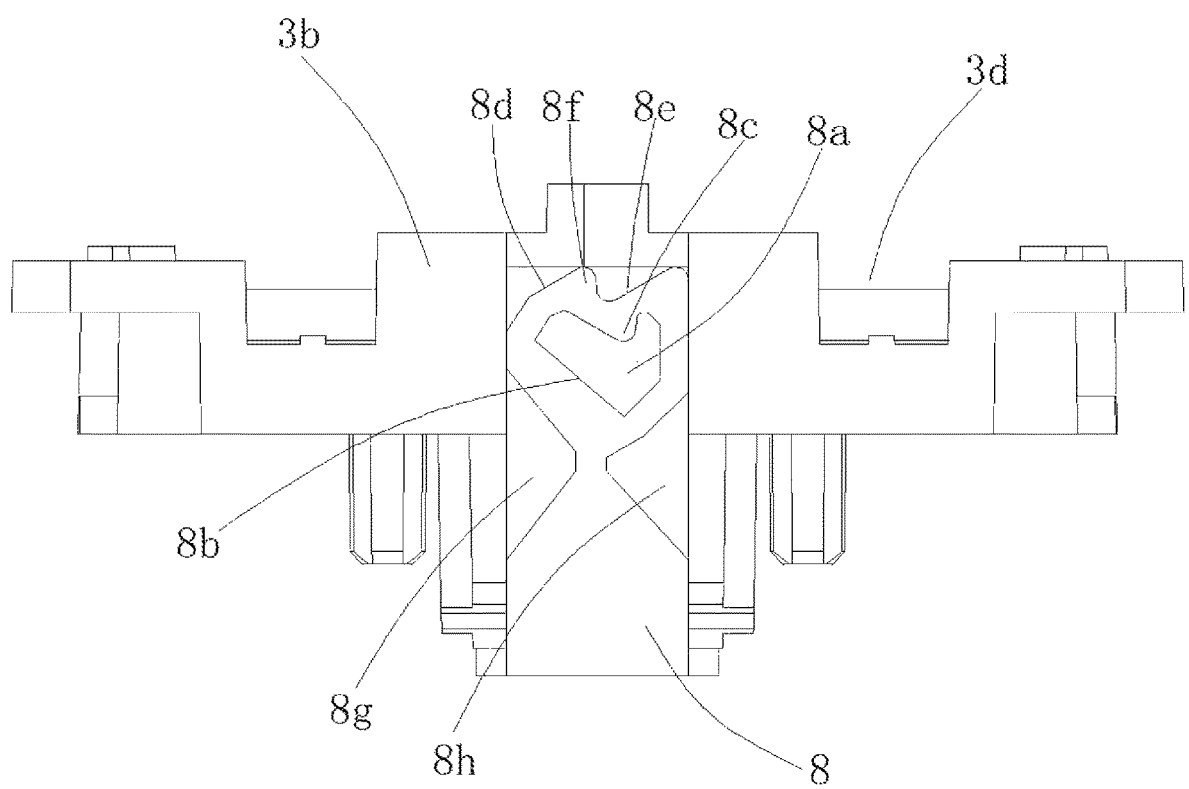
FIG. 13 is a structure diagram of a self-locking guide groove.
Figure 14:
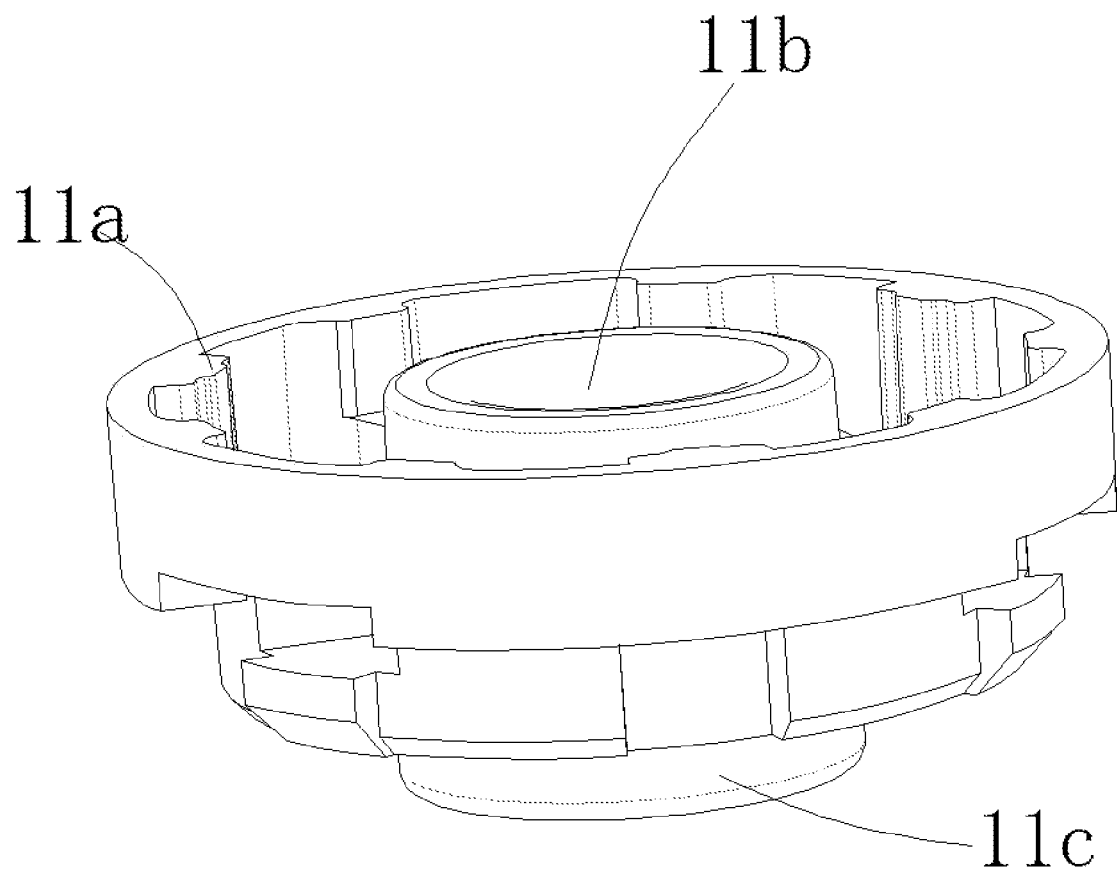
FIG. 14 is a structure diagram of a fixed sleeve in FIG. 5.

A full-automatic gear driven clamping type self-locking mobile phone holder, which solves the defects in existing clamping type car holders for mobile phones that additional auxiliary buttons are needed to remove the mobile phone and the elastic force is too strong and is easy to cause damage to the mobile phone, has advantages of convenient usage and compact structure. As shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13 and FIG. 14, it is designed as the following structure particularly.

The full-automatic gear driven clamping type self-locking mobile phone holder includes a base 1, which is mainly composed of a base spacer 1a, a base cover 1b, a base orientator 1c, a clamping spacer 1d and a nut 1e; the base orientator 1c and the clamping spacer 1d are connected and arranged inside the base cover 1b successively; the clamping spacer 1d is locked on the base 1 by the nut 1e; the base cover 1b, the base orientator 1c and the clamping spacer 1d are fixed together through a screw; the base spacer 1a covers a bottom part of the base cover 1b, and a 3M tape can be attached on a bottom surface of the base spacer 1 for usage.

The base 1 is provided with a rack column 2, the rack column 2 is in fixed connection with the clamping spacer 1d, left and right sides of the rack column 2 are vertically provided with a first rack 2a respectively, the rack column 2 has a top part defining two reset spring grooves that are arranged symmetrically, a reset spring 6 is installed in the reset spring groove, the reset spring groove defines a vertical notch, the notch forms a shell guide groove 2b that is used for guiding the shell 3, and the rack column 2 has a bottom part provided with a flange.

A shell 3 is sleeved on the rack column 2 in a sliding manner, the shell 3 includes a surface cover 3a, a spacer 3b and a lower cover 3c that are overlapped from top to bottom successively, wherein the spacer 3b is located inside a space formed by the surface cover 3a and the lower cover 3c; the spacer 3b defines a slide arm guide groove 3d, the slide arm guide groove 3d extends along the left-right direction of the shell 3, a gear 4 is provided on left and right sides of the lower cover 3c respectively, wherein the gear 4 is an incomplete gear, for which an unused part is removed so that the internal structure of the shell is compact. A rotating shaft passes through the gear 4, the rotating shaft is located on a shaft seat arranged on the lower cover 3c, a shaft cap is arranged on the spacer 3b, and the shaft cap is combined with the shaft seat to fix the rotating shaft. A bottom end of the reset spring 6 presses against a groove bottom of the reset spring groove, and a top end of the reset spring 6 presses against a bottom part of the spacer 3b. The rack column 2 is located inside the lower cover 3c, an inner side of the lower cover 3c is provided with two vertical guide bars 3e, the guide bar 3e on the shell 3 extends into the shell guide groove 2b to make the lower cover 3c and the rack column in guide fit, such that the shell 3 and the rack column 2 can slide relative to each other in vertical direction. A lower opening of the lower cover 32 closes inwards to match with the flange on the rack column 2 to form a limit structure, thereby preventing the rack column 2 falling off the shell 3. The first rack 21 has a tooth surface facing an outer side of the shell 3.

For a better guiding effect, as a preferred structure of the lower cover 3c, an inner side of the lower cover 3c is provided with four vertical guide bars 3e; meanwhile, as a rack column 2 matched with the lower cover 3c of this preferred structure, the rack column 2 defines four shell guide grooves 2b, wherein two shell guide grooves 2b are located on the reset spring grooves, the other two shell guide grooves 2b are formed through a side baffle arranged on one side of the two first racks 2a respectively, the side baffle and a corresponding tooth side surface of the first rack 2a form the shell guide groove 2b. The four guide bars 3e on the shell 3 extend into corresponding shell guide grooves 2b respectively such that the lower cover 3c and the rock column 2 form a guide fit, so the shell 3 and the rack column 2 can slide relative to each other more stably in vertical direction.

The gear 4 and the first rack 2a on the same side are meshed with each other to realize transmission; a clamp arm 5 is provided on left and right sides of the shell 3 respectively, the clamp arm 5 is mainly composed of a horizontally arranged guide slide arm 5a and a vertically arranged clamp jaw connected to one end of the guide slide arm 5a, the guide slide arm 5a of the clamp arm 5 is inserted into the shell 3 in a sliding manner, the guide slide arm 5a is in guide fit with the slide arm guide groove 3d defined on the spacer 3b, the guide slide arm 5a has a bottom surface provided with a second rack 5b extending along the guide direction, and the second rack 5b is meshed with the gear 4 on the same side.

Corresponding first rack 2a, gear 4 and second rack 5b are meshed successively to form a plane gear drive mechanism, such that the structure of the car holder for mobile phone can be designed to be more flat and compact, thereby solving the defects in existing clamping type car holders for mobile phones that additional buttons are needed to remove the mobile phone.

When the shell 3 is pressed down, since the gear 4 is installed in the shell 3 through a rotating shaft, the gear 4 moves downwards along with the shell 4; moreover, as the gear 4 is meshed with the first rack 2a, then the gear 4 is rotated, and the rotated gear 4 drives the meshed second rack 5b to move towards the outer side of the shell 3, thereby driving the two second racks 5b away from each other; the reset spring 6 is continuously compressed during the downward movement of the shell 3, after the shell 3 is stopped being pressed down, the reset spring 6 pushes the shell 3 to move upwards, thereby driving the two second racks 5b close to each other; in this way, the clamp arm 5 can automatically clamp and loosen the mobile phone, single-hand operation can be realized, and the usage is very convenient.

Different from the existing clamp arm return design in which a spring is directly connected to two clamp arms, when the clamp arm 5 of the present invention is reset, the restoring force provided by the reset spring 6 passes through the first rack 2a, the gear 4 and the second rack 5b in turn, thus the clamp arms on the two sides can slowly clamp the mobile phone, thereby solving the problem that the elastic force is too strong and causes damage to the mobile phone.

Preferably, in order to avoid causing damage to the mobile phone when clamping it, it is needed to install a member having a buffering capability on the clamp jaw, for example, a silicone mat 14 is arranged on the clamp jaw of the clamp arm 5.

Embodiment 2

The present embodiment is further optimized based on the above embodiment. To better implement the present invention, the following structure is employed particularly.

A universal ball 9 is connected to a clamping spacer of the base 1 through a bolt, the universal ball 9 has an upward ball joint, the ball joint of the universal ball 9 is moveably sleeved with a bogie 10, the bogie 10 is wrapped on the universal ball 9 and is capable of rotating freely around the universal ball 9, and the bogie 10 is in fixed connection with the rack column 2 through a bolt.

With the above structure, the shell 3 can be rotated to many angles, thereby adjusting the deflection angle of the mobile phone to achieve horizontal and vertical placements of the mobile phone.

Preferably, in order to solve the problem of loose structure, the present preferred scheme provides two specific structures. One structure is described as below: a top part of the bogie 10 is in fixed connection with a fixed sleeve 11 made of hard rubber through a clamping structure, the fixed sleeve 11 has a top inner ring provided with a plurality of convex teeth 11a, the fixed sleeve 11 has a middle part defining a concave center hole 11b, the rack column 2 has a bottom part provided with a gear ring 2c and a center column 2d located inside the gear ring 2c and extending downwards, the center column 2d is inserted into the center hole 11b, the center column 2d is provided with a bolt axially, the bolt passes through the center hole 11b and the center column 2d in turn along the axial line of the center hole 11b to make the center hole 11b and the center column 2d axially fixed connected, the gear ring 2c is located inside the inner ring of the fixed sleeve 11, and the convex teeth 11a are meshed with the gear ring 2c to achieve a fixed circumferential connection between the center hole 11b and the center column 2d; therefore, the fixed sleeve 11 and the rack column 2 are in fixed connection through the bolt and the engagement between the convex teeth 11 and the gear ring 2c. A middle position on the bottom part of the fixed sleeve 11 defines a spring groove, in which a big spring 12 is arranged vertically. Meanwhile, a ball joint top cover 13 is arranged on an inner side of the top part of the bogie 10, a bottom surface of the ball joint top cover 13 is a concave arc surface, the bottom surface of the ball joint top cover 13 fits the ball joint of the universal ball 9, and the big spring 12 has a bottom end pressing against a top surface of the ball joint top cover 13; the big spring 12 makes the bogie 10, the universal ball 9 and the ball joint top cover 13 press against each other to avoid loosening; moreover, the big spring 12 enables a certain elastic up-down travel between the bogie 10 and the fixed sleeve 11, making the whole car holder more elastic.

Another structure is described as below: a top part of the bogie 10 is in fixed connection with a fixed sleeve 11 made of hard rubber through a clamping structure, the fixed sleeve 11 has a top inner ring provided with a plurality of convex teeth 11a, the fixed sleeve 11 has a middle part defining a concave center hole 11b, the rack column 2 has a bottom part provided with a gear ring 2c and a center column 2d located inside the gear ring 2c and extending downwards, the center column 2d is inserted into the center hole 11b, the center column 2d is provided with a bolt axially, the bolt passes through the center hole 11b and the center column 2d in turn along the axial line of the center hole 11b to make the center hole 11b and the center column 2d axially fixed connected, the gear ring 2c is located inside the inner ring of the fixed sleeve 11, and the convex teeth 11a are meshed with the gear ring 2c to achieve a fixed circumferential connection between the center hole 11b and the center column 2d; therefore, the fixed sleeve 11 and the rack column 2 are in fixed connection through the bolt and the engagement between the convex teeth 11 and the gear ring 2c. A middle position on the bottom part of the fixed sleeve 11 is provided with a convex ring 11c, a silicone sleeve 15 is arranged inside the bogie 10, the fixed sleeve 11 holds down a top part of the silicone sleeve 15 to press the silicone sleeve 15 onto an inner wall of the bogie 10, meanwhile, the convex ring 11c presses against a top part of the ball joint of the universal ball 9, the ball joint of the universal ball 9 is inserted into the silicone sleeve 15 so that the silicone sleeve 15 wraps the ball joint of the universal ball 9. With this structure, after assembly, the ball joint of the universal ball 9 is wrapped by the silicone sleeve 15, the ball joint will not be damaged when adjusting the elevation angle, and no friction or collision damage will be caused between the inner wall of the bogie 10 and the universal ball 9.

Preferably, in order to get an elevation adjustment function, the bogie 10 has a bottom end defining a notch 10a through which a connection rod of the universal ball 9 can pass through. The connecting rod of the universal ball 9 can enter the notch 10a, and when the connecting rod of the universal ball 9 is pulled towards the notch 10a, the elevation angle of the shell 3 can be adjusted to the maximum extent.

Embodiment 3

The present embodiment is further optimized based on the above embodiment. To better implement the present invention, the following structure is employed particularly.

The car holder for mobile phone further includes a spring self-locking mechanism arranged inside the shell 3, wherein the spring self-locking mechanism includes a catapult 7 installed on the rack column 2, the rack column 2 defines a catapult groove used for fixing the catapult 7, the locking head of the catapult 7 is upward and is exposed out of the catapult groove; the spring self-locking mechanism further includes a self-locking guide groove 8 connected to a bottom part of the spacer 3b.

Specifically, the self-locking guide groove 8 includes a vertically arranged face plate and a side baffle connected to two sides of the face plate, a middle position on the face plate is provided with a roundabout 8a, the surrounding of the roundabout 8a, together with the face plate, the side baffles of the face plate and the bottom surface of the spacer 3b, forms a passage for the catapult 7 to move, the roundabout 8a has a bottom part provided with a left guide surface 8b that is used for guiding the locking head of the catapult 7 to the left, the locking head points to the left guide surface 8b when the catapult 7 and the self-locking guide groove 8 are in an unlocking state, the roundabout 8a has a top part defining a locking groove 8c that is used for locking the locking head, a left top position on the face plate is provided with a first right guide surface 8d that is used for guiding the locking head to the right, a right top position on the face plate is provided with a second right guide surface 8e that is used for guiding the locking head to the right, a left end of the second right guide surface 8e is protruded downwards to form a locking head limit groove 8f having a downward opening with the first right guide surface 8d, the locking head limit groove 8f is located on the left side of the locking groove 8c, and the locking groove 8c has an opening facing the second right guide surface 8e. A left projecting tongue 8g and a right projecting tongue 8h are provided on the face plate below the roundabout 8a, an entrance is formed between the left projecting tongue 8g and the right projecting tongue 8h, and the left guide surface 8b has a right end beyond the right side of the entrance.

When the shell 3 is pressed, the locking head of the catapult 7 is capable of moving inside the self-locking guide groove 8 to achieve self-locking and self-unlocking. When placing and removing a mobile phone, it is only needed to press down the shell 3 in place to lock the shell 3 and the rack column 2, then the clamp arms 5 are ready in the opening position and the locking position. One time of pressing achieves clamping, one time of pressing again achieves loosening, and it is more convenient to achieve single-hand operation.

The above are the specific embodiments of the present invention merely. However, the protection scope of the present invention is not limited to this. Any variations or substitutions within the technical scope of the present invention that can be easily thought by one skill familiar with the technical field are intended to be covered in the scope of protection of the present invention.

What is claimed is:

1. A full-automatic gear driven clamping type self-locking mobile phone holder, comprising: a base (1), wherein the base (1) is provided with a rack column (2), and two sides of the rack column (2) are vertically provided with a first rack (2a); a shell (3) is sleeved on the rack column (2) in a sliding manner, the shell (3) and the rack column (2) can slide relative to each other in vertical direction, a gear (4) is provided inside the shell (3) on the two sides of the rack column (2) respectively, and the gear (4) is meshed with the first rack (2a) on the same side;

a clamp arm (5) is provided on the shell (3) on the two sides of the rack column (2) respectively, the clamp arm (5) comprises a horizontally arranged guide slide arm (5a) and a vertically arranged clamp jaw connected to one end of the guide slide arm (5a), the guide slide arm (5a) of the clamp arm (5) is inserted into the shell (3) in a sliding manner, the guide slide arm (5a) is provided with a second rack (5b) extending along the guide direction, and the second rack (5b) is meshed with the gear (4) on the same side; the shell (3) is internally connected to a reset spring (6), and the reset spring (6) has a free end connected to the rack column (2);

when the shell (3) is stressed to move downwards, the reset spring (6) is continuously compressed, the gear (4) is rotated under the action of the first rack (2a), and the rotated gear (4) drives the two second racks (5b) away from each other.

2. The full-automatic gear driven clamping type self-locking mobile phone holder according to claim 1, wherein the shell (3) comprises a surface cover (3a), a spacer (3b) and a lower cover (3c) that are overlapped successively; the spacer (3b) defines a slide arm guide groove (3d), the guide slide arm (5a) is in guide fit with the slide arm guide groove (3d), the gear (4) is connected to the lower cover (3c), the rack column (2) is located inside the lower cover (3c), and the rack column (2) is in guide fit with the lower cover (3c).

3. The full-automatic gear driven clamping type self-locking mobile phone holder according to claim 2, further comprising a spring self-locking mechanism arranged inside the shell (3), wherein the spring self-locking mechanism comprises a catapult (7) installed on the rack column (2) and a self-locking guide groove (8) connected to the spacer (3b), and when the shell (3) is pressed, a locking head of the catapult (7) is capable of moving inside the self-locking guide groove (8) to achieve self-locking and self-unlocking.

4. The full-automatic gear driven clamping type self-locking mobile phone holder according to claim 3, wherein the self-locking guide groove (8) comprises a vertically arranged face plate and a side baffle connected to two sides of the face plate, a middle position on the face plate is provided with a roundabout (8a), the roundabout (8a) has a bottom part provided with a left guide surface (8b) that is used for guiding the locking head of the catapult (7) to the left, the locking head points to the left guide surface (8b) when the catapult (7) and the self-locking guide groove (8) are in an unlocking state, the roundabout (8a) has a top part defining a locking groove (8c) that is used for locking the locking head, a left top position on the face plate is provided with a first right guide surface (8d) that is used for guiding the locking head to the right, a right top position on the face plate is provided with a second right guide surface (8e) that is used for guiding the locking head to the right, a left end of the second right guide surface (8e) is protruded downwards to form a locking head limit groove (8f) having a downward opening with the first right guide surface (8d), the locking head limit groove (8f) is located on the left side of the locking groove (8c), and the locking groove (8c) has an opening facing the second right guide surface (8e).

5. The full-automatic gear driven clamping type self-locking mobile phone holder according to claim 4, wherein a left projecting tongue (8g) and a right projecting tongue (8h) are provided on the face plate below the roundabout (8a), an entrance is formed between the left projecting tongue (8g) and the right projecting tongue (8h), and the left guide surface (8b) has a right end beyond the right side of the entrance.

6. The full-automatic gear driven clamping type self-locking mobile phone holder according to claim 5, wherein a universal ball (9) with an upward ball joint is arranged on the base (1), the ball joint of the universal ball (9) is moveably sleeved with a bogie (10), and the bogie (10) is in fixed connection with the rack column (2).

7. The full-automatic gear driven clamping type self-locking mobile phone holder according to claim 6, wherein a top part of the bogie (10) is in fixed connection with a fixed sleeve (11), the fixed sleeve (11) has a top inner ring provided with a plurality of convex teeth (11a), the fixed sleeve (11) has a middle part defining a concave center hole (11b), the rack column (2) has a bottom part provided with a gear ring (2c) and a center column (2d) located inside the gear ring (2c) and extending downwards, the center column (2d) is inserted into the center hole (11b), the center column (2d) is provided with a bolt axially, the bolt passes through the center hole (11b) and the center column (2d) in turn to make the center hole (11b) and the center column (2d) axially fixed connected, the gear ring (2c) is located inside the inner ring of the fixed sleeve (11), and the convex teeth (11a) are meshed with the gear ring (2c) to achieve a fixed circumferential connection between the center hole (11b) and the center column (2d);

the fixed sleeve (11) has a bottom part defining a spring groove, in which a big spring (12) is arranged; a ball joint top cover (13) is arranged in the bogie (10), the ball joint top cover (13) has a bottom surface fitting the ball joint of the universal ball (9), and the big spring (12) has a free end pressing against a top surface of the ball joint top cover (13);

or, the fixed sleeve (11) has a bottom part provided with a convex ring (11c), a silicone sleeve (15) is arranged inside the bogie (10), the fixed sleeve (11) presses the silicone sleeve (15) onto an inner wall of the bogie (10), the convex ring (11c) presses against a top part of the ball joint of the universal ball (9), and the silicone sleeve (15) is wrapped on the ball joint of the universal ball (9).

8. The full-automatic gear driven clamping type self-locking mobile phone holder according to claim 7, wherein the bogie (10) has a bottom end defining a notch (10a) through which a connection rod of the universal ball (9) can pass through.

9. The full-automatic gear driven clamping type self-locking mobile phone holder according to claim 1, wherein the gear (4) is an incomplete gear.

10. The full-automatic gear driven clamping type self-locking mobile phone holder according to claim 1, wherein a silicone mat (14) is arranged on the clamp jaw of the clamp arm (5).

* * * * *